(12) United States Patent
Gednalske et al.

(10) Patent No.: US 6,382,133 B1
(45) Date of Patent: May 7, 2002

(54) METHOD OF TREATING MANURE

(75) Inventors: Joe V. Gednalske, River Falls, WI (US); Robert W. Herzfeld, Stillwater; Mark D. Schoenfeld, Roseville, both of MN (US)

(73) Assignee: Agriliance LLC, Arden Hills, MN (US)

( * ) Notice: Subject to any disclaimer, the term of this patent is extended or adjusted under 35 U.S.C. 154(b) by 0 days.

(21) Appl. No.: 09/667,074

(22) Filed: Sep. 21, 2000

(51) Int. Cl.[7] .................. A01K 29/00; A01K 1/01; C05F 3/00
(52) U.S. Cl. .................. 119/174; 119/527; 71/21
(58) Field of Search .................. 119/174, 710, 119/711, 527, 528; 71/21

(56) References Cited

U.S. PATENT DOCUMENTS

| 440,236 A | * | 11/1890 | Williams ............... 119/527 |
| 454,745 A | * | 6/1891 | Lee ..................... 119/527 |
| 2,271,619 A | | 2/1942 | Bradshaw et al. ......... 260/410 |
| 2,360,844 A | | 10/1944 | Bradshaw et al. ....... 260/410.9 |
| 3,611,997 A | * | 10/1971 | Benno .................. 119/527 |
| 4,164,506 A | | 8/1979 | Kawahara et al. ....... 260/410.9 |
| 4,230,478 A | * | 10/1980 | Zumbrunn ............... 71/21 |
| 4,405,354 A | * | 9/1983 | Thomas, II et al. ....... 71/21 |
| 4,436,547 A | | 3/1984 | Sampson ................. 71/76 |
| 4,555,063 A | | 11/1985 | Goettsch .............. 241/46.04 |
| 4,557,751 A | | 12/1985 | Ronning et al. .......... 71/91 |
| 4,695,411 A | | 9/1987 | Stern et al. .......... 260/410.9 |
| 4,698,186 A | | 10/1987 | Jeromin et al. .......... 260/421 |
| 4,867,972 A | | 9/1989 | Girardeau et al. ........ 424/81 |
| 4,953,501 A | * | 9/1990 | Moreau ................. 119/528 |
| 4,956,286 A | | 9/1990 | Macrae ................. 435/134 |
| 4,971,630 A | | 11/1990 | Skaptason .............. 71/117 |
| 5,116,401 A | | 5/1992 | Young .................. 71/86 |
| 5,118,338 A | | 6/1992 | Moller ................. 71/86 |
| 5,260,260 A | | 11/1993 | Gednalske et al. ....... 504/206 |
| 5,275,783 A | | 1/1994 | Menassa et al. .......... 422/5 |
| 5,463,180 A | | 10/1995 | Gednalske et al. ....... 504/323 |
| 5,495,033 A | | 2/1996 | Basu et al. ............. 554/1 |
| 5,521,144 A | | 5/1996 | Farr et al. ............ 504/215 |
| 5,624,883 A | | 4/1997 | Basu et al. ............ 504/116 |
| 5,686,384 A | | 11/1997 | Hester ................. 504/116 |
| 5,732,658 A | * | 3/1998 | Wolters et al. ......... 119/527 |
| 5,772,722 A | * | 6/1998 | Gednalske et al. ........ 71/21 |
| 5,939,358 A | | 8/1999 | Hester ................. 504/116 |
| 6,248,148 B1 | * | 6/2001 | Faulmann et al. ......... 71/21 |

FOREIGN PATENT DOCUMENTS

GB        957679        5/1964

OTHER PUBLICATIONS

Zinn, R. A.; Fat Quality and Feeding Value of Fat for Feedlot Cattle. Presentation at the Southwest Nutrition and Management Conference in 1995 at Ahwarukee, Arizona. p. 43–58 of the Conference papers.

(List continued on next page.)

*Primary Examiner*—Charles T. Jordan
*Assistant Examiner*—Elizabeth Shaw
(74) *Attorney, Agent, or Firm*—Kinney & Lange, P.A.

(57) ABSTRACT

A method of increasing the feed efficiency of an animal, the method including applying a suppression agent to surfaces of manure that are exposed to atmosphere, the suppression agent including acidulated plant-based soapstock, the manure located proximate the animal, the method also including providing feed to the animal.

35 Claims, 1 Drawing Sheet

OTHER PUBLICATIONS

Terry, Lisa; *Smothering Smells—Soy–Based Product Helps Reduce Odors From Swine Operations and Other Farming Enterprises*; Cooperative Partners, pp. 12–13 (Sep. 1999).

*Smell stoppers*; AG Innovation News, Apr. 1999; vol. 8, No. 2; 3 pages.

Grossbord et al.; *The Herbicide Glyphosate*, pp. 223–229 (1985).

Hoorne et al.; *Novel adjuvants for agrochemical formulations based on sugar ethers*, ICI Reprint RP67/91E. (1991).

Choo et al.; Conversion of Crude Palm Kernel Oil Into Its Methyl Esters on a Pilot Plant Scale, Proceedings, World Conference on Oleochemicals: Into the $21^{st}$ Century, pp. 292–295 (1991).

*The Merck Index*, $10^{th}$ Ed. Windholz et al. (editor), Merck & Co., Inc. p. 1249 (1983).

*McCutcheon's Emulsifiers & Detergents*, MC Publishing Co., p. 192 (1990).

*The Agrochemicals Handbook*, $3^{rd}$ Ed., Kidd et al. (editor), Royal Society of Chemistry (1991).

Puritch George; *Pesticidal Soaps and Adjuvants—What are They and How do They Work?*, $23^{rd}$ Annual Lower Mainland Horticultural Improvement Association Growers' Short Course—Feb. 11–13, 1981; pp. 53–66.

Van Valkenburg, J. Wade; *Adjuvants for Herbicides*, pp. i–ii, 1–8 (1979).

*1992 North Dakota Weed Control Research*; North Dakota University, pp. 65–71.

Bulletin entitled *Surfactant Product ANA*. Published prior to Sep. 21, 1999.

* cited by examiner

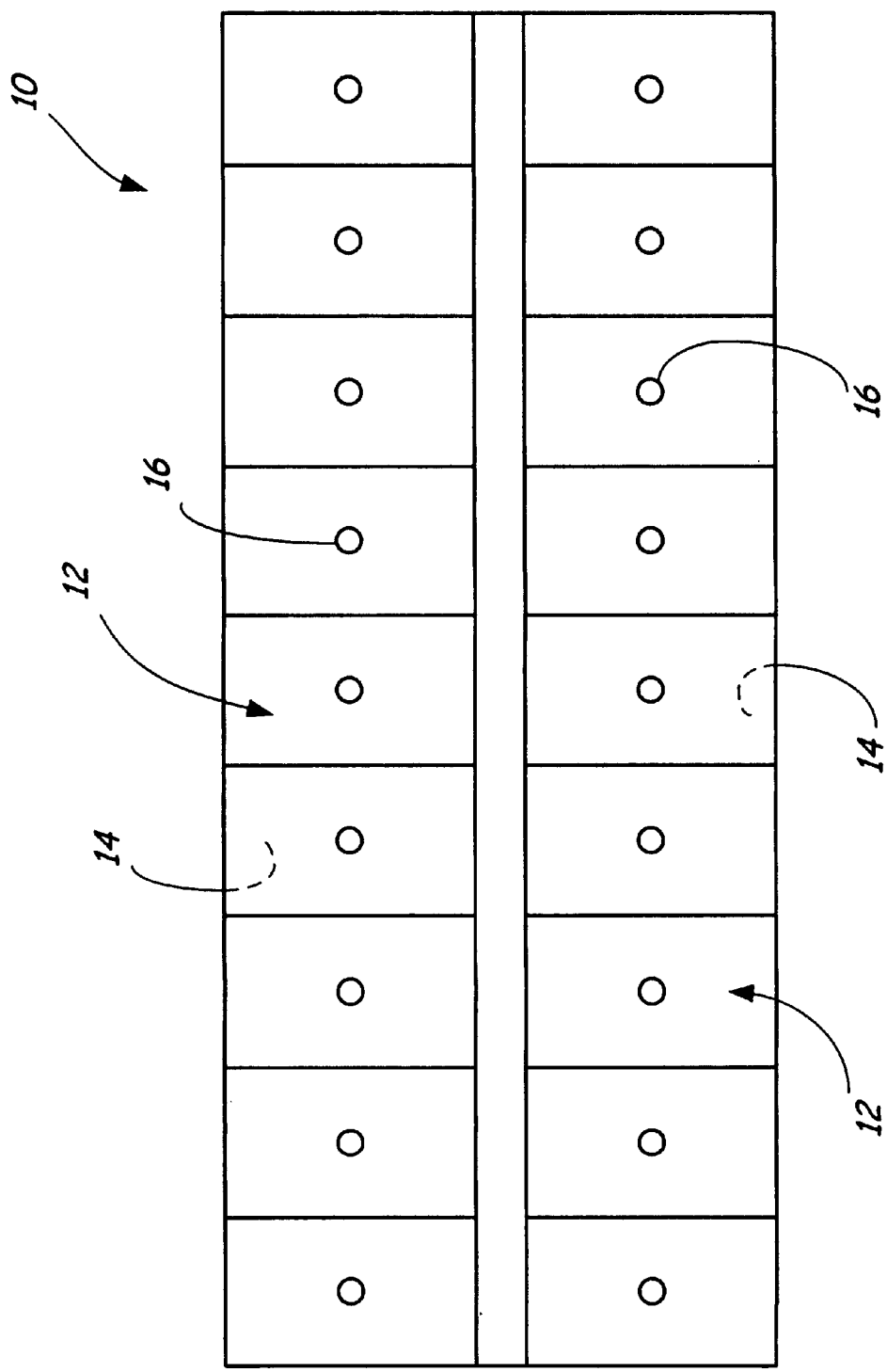
FIGURE

METHOD OF TREATING MANURE

BACKGROUND OF THE INVENTION

The present invention generally relates to a method of treating manure and to a manure treating agent. More particularly, the present invention relates to a method of improving the health of animals that are exposed to vapors emitted by manure, to a method of reducing the amount of feed for animals that are exposed to vapors emitted by manure and to a method of decreasing emissions of noxious vapors, such as hydrogen sulfide and ammonia, from manure.

Hog, cattle, and poultry feeding operations, whether the operations occur in outdoor feed lots, in enclosed barn feeding operations, or in a traditional farm environment, generate a continuous supply of manure. In barn feeding operations, manure collection pits are often located directly beneath the animals; in such barn feeding operations, the animals often stand on grates that are located above the manure pits. In outdoor feed lots, the manure accumulates on the ground beneath the animal, no matter how diligent one is at cleaning the feed lot.

Manure typically emits vapor. Thus, animals being cared for in feeding operations and humans who care for these animals are constantly exposed to manure vapors. The manure vapors include, among other components, hydrogen sulfide and ammonia. It is generally believed desirable to reduce the airborne concentrations of noxious vapors, such as hydrogen sulfide and ammonia, that animals in confinement and feeding operations are exposed to. Likewise, it is believed desirable to reduce hydrogen sulfide and ammonia levels that human beings who care for the animals are exposed to in confinement and feeding operations.

There clearly would be benefits to reducing the airborne concentrations of both hydrogen sulfide and ammonia that animals in confinement and feeding operations are exposed to. Such an approach would also beneficially reduce hydrogen sulfide and ammonia exposure by humans who attend to the animals in the confinement and feeding operations. The method and composition of the present invention achieve both of these goals and therefore provide a new way of improving the health of animals in confinement and feeding operations.

BRIEF SUMMARY OF THE INVENTION

The present invention includes a method of increasing the feed efficiency of an animal. The method includes applying a suppression agent that includes acidulated plant-based soapstock to surfaces of manure that are exposed to atmosphere where the manure is located proximate the animal. The method also includes providing feed to the animal. The present invention further includes a method of reducing the rate of death of animals that are exposed to manure and a composition.

BRIEF DESCRIPTION OF THE DRAWINGS

The FIGURE is a schematic of an animal confinement and feeding barn.

DETAILED DESCRIPTION

The present invention generally relates to a method of treating manure and to a manure treating agent, such as a vapor suppression agent. More particularly, the present invention relates to a method of improving the health of animals that are exposed to vapors emitted by manure, to a method of reducing the amount of feed for animals that are exposed to vapors emitted by manure, and to a method of decreasing emissions of noxious vapors from manure. The method and composition of the present invention surprisingly improve the health of animals being held and/or fed in confinement and feeding operations, reduce the death rate of animals being held and/or fed in confinement and feeding operations, and also reduce the amount of feed and the cost of veterinary care required by animals being fed in confinement and feeding operations.

The vapor suppression agent of the present invention may be based upon or include acidulated plant-based soapstock. The concentration of-the acidulated plant-based soapstock in the suppression agent may generally be any volume percent, based upon the total volume of the suppression agent, that is effective to reduce the level of noxious vapors emitted from manure. Preferably, the concentration of acidulated plant-based soapstock in the suppression agent is an effective concentration that ranges from about 20 volume percent to about 70 volume percent, based upon the total volume of the suppression agent. More preferably, the concentration of the acidulated plant-based soapstock in the suppression agent is approximately 65 volume percent, based upon the total volume of the suppression agent.

The suppression agent may additionally include an emulsifier in an effective concentration range. Preferred emulsifiers for the suppression agent include ethoxylated nonylphenols, such as nonoxynol. One example of the ethoxylated nonylphenol surfactant that is suitable for use in the suppression agent is IGEPAL®-C0630 nonoxynol-based surfactant that is available from Rhone-Poulenc of France. However, other emulsifiers may permissibly be used alone, or in combination with, nonoxynol in formulating the suppression agent of the present invention.

The emulsifier may be present in the suppression agent at any concentration that is effective to emulsify components of the suppression agent. Preferably, the emulsifier is present in the suppression agent at an effective concentration that ranges from about 20 volume percent to about 60 volume percent, based upon the total volume of the suppression agent.

The suppression agent may also incorporate a viscosity reducing agent. The viscosity reducing agent helps to reduce the viscosity of the suppression agent to a viscosity level that makes handling of the suppression agent, such as mixing, transferring, spraying, and pouring of the suppression agent, easier. Some non-exhaustive examples of suitable viscosity reducing agents include alcohols, such as ethanol, isopropanol, n-butanol, and any of these in any combination. Another suitable and preferred example of the viscosity reducing agent is an ethanol-water blend having an ethanol concentration of approximately 70 volume percent and a water concentration of about 30 volume percent, based upon the total volume of the ethanol-water blend. One suitable ethanol-water blend having an ethanol concentration within this range is a by-product of soybean protein manufacturing processes.

The viscosity reducing agent may be incorporated in the suppression agent at any effective concentration. Some examples of effective concentrations for the viscosity reducing agent in the suppression agent are concentrations ranging from about 10 volume percent to about 20 volume percent, based upon the total volume of the suppression agent. One preferred effective concentration of the viscosity reducing agent in the suppression agent is approximately 15 volume percent, based upon the total volume of the suppression agent. Higher concentrations of the viscosity reducing agent are particularly beneficial when the suppression agent is to be used at suppression agent temperatures of less than about 50° F. and/or when ambient temperatures during use of the suppression agent will be less than about 50° F.

The suppression agent may additionally include water at an effective concentration. Some examples of effective concentrations of water in the suppression agent are concentrations of water ranging from about 5 volume percent to about 10 volume percent, based upon the total weight of the suppression agent, when ethanol, isopropanol, n-butanol, or any combination of these is used as the viscosity reducing agent. When the ethanol-water blend is used as the viscosity reducing agent, additional water need not be incorporated in the suppression agent. Using water within the effective concentration range, such as the about 5 volume percent to about 10 volume percent range specified above, reduces the cost of formulating the suppression agent without reducing the performance of the suppression agent.

The suppression agent is preferably fabricated by first combining an effective concentration of the viscosity reducing agent with an effective concentration of the emulsifier to form a dispersion of the viscosity reducing agent and the emulsifier. The acidulated plant-based soapstock may then be added to the dispersion of the viscosity reducing agent and the emulsifier. These three components are then sufficiently mixed to provide the suppression agent with a substantially homogenous composition. The suppression agent may thereafter be stored at ambient temperatures without exhibiting any significant changes in either consistency or activity. A preferred mixing order and composition for the suppression agent are set forth in Table 1 below.

TABLE 1

| MIXING ORDER | INGREDIENT | CONCENTRATION* (VOLUME PERCENT) |
|---|---|---|
| 1 | Nonoxynol | 20 |
| 2 | Viscosity Reducing Agent | 15 |
| 3 | Acidulated Plant-Based Soapstock | 65 |

*Based upon the total volume of the suppression agent

Based upon the total volume of the suppression agent The acidulated plant-based soapstock component is typically a highly viscous brown liquid with a specific gravity on the order of about 0.95 grams per cubic centimeter. When formulating the suppression agent, the acidulated plant-based soapstock is preferably heated to a temperature of at least about 72° F. This heating reduces the viscosity of the acidulated plant-based soapstock and thereby assists in forming the requisite homogenous mixture.

The acidulated plant-based soapstock may be formed by acidulating plant-based soapstock. The plant-based soapstock may be partially acidulated; preferably, however, the plant-based soapstock is completely acidulated. Plant-based soapstock results from using an organic solvent, such as hexane, and other industrial substances to extract and refine edible oil from plant components. For example, plant-based soapstock may be formed as a result of extraction and refining of edible oil from soybeans, corn, cottonseed, canola seeds, sunflower seeds, safflower seeds, olives, palm kernels, coconuts, and nuts, such as peanuts and walnuts. Plant-based soapstock is a by-product of the refining of plant-based oil. In plant-based oil processing, crude plant-based oil is treated with a base, such as dilute sodium hydroxide, to neutralize any free fatty acids present in the crude plant-based oil and thereby convert the free fatty acids of the crude plant-based oil into soapstock. Alternatively, soda ash may be used alone, or in combination with the sodium hydroxide, to effect conversion of the free fatty acid content of the crude plant-based oil into soapstock. Thereafter, the soapstock may typically be separated from any remaining crude plant-based oil by centrifugation or gravity settling. Next, the soapstock may be acidulated by adding an acid, such as sulfuric acid, to the soapstock to recover the residual free fatty acids.

The yield of plant-based soapstock is typically on the order of about six volume percent of the total volume of refined crude plant-based oil. The concentration of free fatty acids in acidulated plant-based soapstock is typically on the order of less than about one volume percent of the refined crude plant-based oil, based upon the total volume of the refined crude plant-based oil. Plant-based soapstock is also sometimes referred to as "foots" since the soapstock accumulates at the bottom of the refining tank. The acidulated plant-based soapstock is generally regarded as a relatively unrefined waste product of plant-based oil processing. Because of these characteristics, acidulated plant-based soapstock has previously experienced only limited commercial use by soap manufacturers and animal producers.

The acidulated plant-based soapstock employed in the present invention may generally be derived from extraction and refining of oil from any plant or plant component. Some non-exhaustive examples of acidulated plant-based soapstocks include acidulated soybean soapstock, acidulated corn soapstock, acidulated cottonseed soapstock, acidulated canola seed soapstock, acidulated sunflower seed soapstock, acidulated safflower seed soapstock, acidulated olive soapstock, acidulated palm kernel soapstock, acidulated coconut soapstock, acidulated peanut soapstock, acidulated walnut soapstock, and any of these in any combination. Some non-exhaustive examples of sources for many or all of these and other acidulated plant-based soapstocks are Feed Energy of Des Moines, Iowa; Valley Products Company of Memphis, Tenn.; and Honeymead Products Co. of Mankato, Minn.

Though subsequent references to the acidulated plant-based soapstock are primarily provided in terms of acidulated soybean soapstock, it is to be understood that any acidulated plant-based soapstock including, but not limited to, acidulated soybean soapstock, acidulated corn soapstock, acidulated cottonseed soapstock, acidulated canola seed soapstock, acidulated sunflower seed soapstock, acidulated safflower seed soapstock, acidulated olive soapstock, acidulated palm kernel soapstock, acidulated coconut soapstock, acidulated peanut soapstock, acidulated walnut soapstock, and any of these in any combination may be employed in the compositions and methods of the present invention to achieve to results and benefits of the present invention.

Though the terms soapstock and acidulated soapstock are used predominantly herein, it is to be understood that derivatives of any soapstock or acidulated soapstock recited herein that merely concentrate, dilute, or fractionate the fatty acid component of the soapstock or the acidulated soapstock are considered to be generally suitable substitutes and equivalents of the recited soapstock and acidulated soapstock and may be used in any combination with, or in place of, the recited soapstock and acidulated soapstock in the present invention. For example, black oil, which is formed by further refining soybean soapstock, and: then acidulating the further refined soybean soapstock, to reduce the free fatty acid loading, may be used in place of, or in combination with the acidulated plant-based soapstock. Black oil may be obtained from Honeymead Products Co. of Mankato, Minn.

Contract grade acidulated soybean soapstock includes a total fatty acid concentration of not less than about 85 volume percent, based upon the total volume of the contract grade acidulated soybean soapstock. However, the acidulated soybean soapstock that may be used to form the suppression agent of the present invention preferably has a total fatty acid concentration ranging from about 94 volume percent to about 96 volume percent, based upon the total volume of the acidulated soybean soapstock. Additionally, contract grade acidulated soybean soapstock typically has a moisture level ranging up to about 5 volume percent, based upon the total volume of the contract grade acidulated soybean soapstock. One typical analysis of acidulated soybean soapstock that is available from Honeymead Products Co. of Mankato, Minn., is set forth in Table 2 below.

TABLE 2

| ACID VALUE | 80–130 |
|---|---|
| TOTAL FATTY ACIDS* | 94% TO 96% |
| COLOR | DARK |
| IODINE VALUE | 118–130 |
| MOISTURE (KARL-FISHER)* | <5% |

*Volume percent, based upon the total volume of the acidulated soybean soapstock The fatty acid profile of this acidulated soybean soapstock that may be obtained from Honeymead Products is set forth in Table 3 below:

TABLE 3

| FATTY ACID | WEIGHT PERCENT, BASED UPON TOTAL WEIGHT OF ALL FATTY ACIDS PRESENT IN THE ACIDULATED SOYBEAN SOAPSTOCK |
|---|---|
| Myristic Acid (14:0) | 0.1 |
| Palmitic Acid (16:0) | 14.1 |
| Stearic Acid (18:0) | 4.8 |
| Oleic Acid (18:1) | 21.0 |
| Linoleic Acid (18:2) | 52.2 |
| Linolenic Acid (18:3) | 6.9 |
| Arachidic Acid (20:0) | 0.3 |
| Behenic Acid (22:0) | 0.4 |

The nonoxyl that may be used as the emulsifying agent when formulating the suppression agent of the present invention is described in U.S. Pat. No. 2,313,477, which is hereby incorporated by reference. Nonoxyl is also known by a variety of other chemical names, including $\Delta$-(nonylphenyl)-$\omega$-(hydroxypoly(oxy-1,2-ethanediyl); polyethylene glycol ether; mono(nonylphenyl)ether; macrogel nonylphenyl ether; polyoxyethylene(n)nonylphenyl ether; nonylphenyl polyethylene glycol ether; nonylphenoxy polyethoxyethanol; and poly(oxy-1,2-ethanediyl)-$\Delta$-(nonylphenol)-$\Omega$-hydroxy. Nonoxynol is identified by CAS Registration No. 0009016-45-9 by the Chemical Abstracts Service. The chemical formula of nonoxynol is: $C_9H_{19}$—$(OCH_2$—$CH_2)_n OH$. In this chemical formula, "n" may range from 8–10 carbon atoms, with 9 carbon atoms being preferred.

The suppression agent of the present invention, when applied to manure as described herein, has surprisingly been found to be effective for producing a number of different benefits. For example, application of the suppression agent to manure in accordance with the present invention has been found to reduce airborne concentrations of hydrogen sulfide gas to which animals are exposed by at least about 70 percent. Similarly, application of the suppression agent in accordance with the present invention is believed to reduce airborne concentrations of ammonia to which the animals are exposed. These reductions in exposure to hydrogen sulfide gas and ammonia gas may contribute to other benefits that have been discovered upon use of the suppression agent in accordance with the present invention.

First, the feed efficiency for animals exposed to manure treated in accordance with the present invention, as compared to the feed efficiency of animals exposed to untreated manure, has been surprisingly found to increase. For example, the feed efficiency for pigs exposed to manure treated in accordance with the present invention, as compared to the feed efficiency of pigs exposed to untreated manure, has been surprisingly found to increase on the order of about 3 percent to about 6 percent. The feed efficiency is determined by dividing the pounds of feed fed to the animals during a test period by the pounds of weight gain experienced by the animal during the test period. Where feed efficiency during a first test period, when manure that animals are exposed to is not treated with the suppression agent, is being compared to feed efficiency during a second test period, when the manure that the animals are exposed to is treated with the suppression agent, the same feed is provided to the animals during the first test period and the second test period and the same animals are present during the first test period and the second test period.

Another measure of feed utilization has also been found to improve after treatment of manure with the suppression agent in accordance with the present invention. More particularly, the ratio of feed cost per hundred pounds of weight gain by animals exposed to manure has been found to decrease after treatment of the manure with the suppression agent in accordance with the present invention. For example, the ratio of feed cost per hundred pounds of weight gain by pigs exposed to manure has been found to decrease anywhere from about 3 percent up to about 26 percent, after treatment of the manure with the suppression agent in accordance with the present invention.

Another important benefit that occurs following treatment of manure with the suppression agent in accordance with the present invention is a dramatic reduction in the death rate of animals exposed to the manure. For example, the death rate of pigs exposed to manure treated with the suppression agent in accordance with the present invention is reduced by at least about 42 percent, as compared to the death rate of pigs exposed to untreated manure. This correlates well with the observation that the cost of veterinary care per hundred pounds of the pig, as sold, is reduced from about 25 percent up to about 49 percent for pigs exposed to manure that has been treated with the suppression agent in accordance with the present invention, as compared to pigs exposed to untreated manure.

Finally, another benefit of the present invention concerns aesthetics. In particular, manure that has been treated with the suppression agent in accordance with the present invention attracts fewer insects, such as gnats and flies, as compared to untreated manure. This reduction of the insect population reduces the stress level of animals located proximate the treated manure and reduces the opportunity for disease transmission by insects.

The suppression agent of the present invention may be applied to manure generated by any animal to reduce noxious vapor emissions from the manure and consequently reduce exposure of the animal to noxious vapor emissions from the manure. Some non-exhaustive examples of animals that may produce manure that will benefit from treatment with the suppression agent in accordance with the present invention include poultry, such as chickens, ducks, turkeys, pheasants, geese, ostriches, and emus; swine, such as pigs and hogs; ruminants, such as cattle, sheep, goats, oxen, musk ox, llamas, alpacas, guanicos, deer, bison, antelopes, camels and giraffes; and horses. The animals that are exposed to the manure may be fed any feed considered appropriate to the particular animal by those of ordinary skill in the art of animal husbandry.

The various methods employing the treatment or suppression agent of the present invention, such as the method of the present invention for improving the health of animals exposed to manure vapor, the method of increasing the feed efficiency for animals exposed to manure vapor, the method for reducing the airborne concentration of hydrogen sulfide vapor emanating from manure, the method for reducing the airborne concentration of ammonia vapor emanating from manure and the method for reducing the death rate of animals exposed to manure, generally contemplate periodic applications of the treatment or suppression agent to the manure. These applications entail distributing or applying the suppression agent over exposed surfaces of the manure in a manner that allows the suppression agent to coat exposed surfaces of the manure.

Exposed surfaces of the manure are those surfaces of the manure that are exposed to atmosphere; consequently, exposed surfaces of the manure will be visible to a person when viewed by the person from outside of the manure. The suppression agent may be poured onto the manure or, more beneficially, may be sprayed onto the manure to effect enhanced coverage of exposed surfaces of the manure with the suppression agent. To maximize the benefits of the inventive suppression agent application technique, the manure is preferably not mixed or stirred after application of the suppression agent to exposed surfaces of the manure.

As more manure is deposited on manure that was previously coated with the suppression agent, additional suppression agent may, and preferably is, applied to exposed surfaces of the newly deposited manure. Applications of the suppression agent to exposed surfaces of manure not previously treated with the suppression agent may occur on any schedule. Nonetheless, an application schedule that minimizes the amount of time exposed manure surfaces remain untreated with the suppression agent will help to maximize the benefits attainable by application of the suppression agent in accordance with the present invention. Generally, it has been found generally adequate to make periodic applications of the suppression agent to the exposed surfaces of the manure on a weekly schedule of about every 7 days, or even on monthly schedule of about every 30 days or so.

It is generally believed better to make smaller, more frequent, applications of the suppression agent to the manure. One suitable approach for determining the application rate for the suppression agent is to determine the overall volume of manure production during the year. Thereafter, this annual manure volume may be multiplied by a factor of about 0.0005 to determine the approximate volume of the suppression agent to be applied to exposed surfaces of the manure annually. This annual volume of suppression agent to be applied then may be divided by the number of different periodic applications during the year to determine the volume of suppression agent to be applied during each periodic application.

When the applications of the suppression agent are to be made to manure located in pits in a barn, one suitable approach is to determine how many individual animal pens are located over manure pits. Then, the periodic application rate, such as the weekly or monthly application rate, may be divided by the number of different animal pens located over manure pits to determine the volume of suppression agent to be applied during each periodic application to each pen that is located over the manure pit. Also, when dealing with manure pits located beneath animal pens, it is suitable to substitute the maximum manure volume that may accumulate in the manure pit, rather than relying on the estimated volume of total manure accumulation for the entire year.

Again, the periodic applications maybe made by simply pouring the suppression agent, such as via a funnel, onto the manure that is located in the manure pit to coat exposed surfaces of the manure. Due to the liquid, or semi-liquid nature of manure, the suppression agent will tend to migrate over the exposed surface of the manure to cover most, if not all, of the exposed surface of the manure. Alternatively, the periodic applications may be made by spraying the suppression agent onto exposed surfaces of the manure to enhance early coating of exposed manure surfaces with the suppression agent.

One typical barn design is depicted at 10 in FIG. 1. In the barn design 10, individual animal pens 12 are provided. The barn design 10 may include individual manure pits 14 located beneath each pen 12. Alternatively, the individual manure pits 14 may take the form of one or more larger manure pits (not shown) that collectively extend beneath different pens 12.

No matter how the manure pit volume is divided, or undivided, practicing the method of the present invention permissibly entails first determining the total manure pit capacity beneath the pens 12. This overall volumetric capacity of the manure pits in the barn design 12 may then be multiplied by the factor of about 0.0005 to determine the volume of barrier to be applied to the manure pit or pits 12 over the course of the year. Then, if a monthly application of the suppression agent is desired, the annual volume of suppression agent to be applied may be divided by twelve, to determine the monthly application rate over the entire manure pit structure in the barn design 12. Finally, monthly volumes to be applied to the manure pit(s) of the barn design 12 may be divided by the total number of individual pens located over the manure pit or pits 12 in the barn design 10 to determine the volume of suppression agent to be applied monthly to the manure pit 12 or portion of manure pit located beneath each individual pen 12 in the barn design 10.

After making this determination, monthly applications of the suppression agent may be made to the exposed manure surface via a central location within each pen 12, such as at the center position 16 in each pen 12, to distribute the suppression agent over surfaces of the manure that are exposed within the manure pit or pits 14 of the barn design 10. These individual applications in the pens 16, again, may be made by simply pouring the suppression agent through a funnel that is positioned between the slats in the grate proximate the center position 16 of each pen 12. For larger sizes of pens 12, multiple positions within the pens 12 may be selected for depositing the suppression agent on exposed surfaces of the manure. For smaller sizes of the pens 12, it is permissible to skip applications of the suppression agent through some of the pens. 12, so long as the applications that are made distributed about the exposed surface of the manure to allow movement of the applied suppression agent over most, if not all, of the exposed manure surface.

The suppression agent may also be applied to exposed surfaces of manure that is accumulated in pits or on the ground in outdoor animal feeding and confinement areas where animals will be exposed to the manure. As with applications inside barns, the applications to manure in outdoor animal feeding and confinement areas may be made by pouring or spraying the suppression agent onto exposed surfaces of the manure. The points at which the suppression agent is applied, such as by pouring or spraying, should be uniformly distributed about the standing manure to enhance coverage of the exposed manure surfaces with the suppression agent.

MANURE VAPOR TESTING PROCEDURE

The equipment setup for the manure vapor testing procedure includes a plurality of test columns. Each test column is made of 15-inch diameter polyvinyl chloride (PVC) pipe. Each test column is formed by standing the column of PVC pipe on end. A two-inch diameter pipe and attached two-inch valve are located at the base of each column for manure disposal and to provide access for manure sampling. Each column has both an intake port and an exhaust port proximate the top of the column. An intake pipe that is made of four-inch diameter PVC pipe is attached to the intake port, and an exhaust pipe that is made of four-inch diameter PVC pipe is attached to the exhaust port.

A flowmeter and a charcoal filtering system are attached to the intake pipe. The flow meter is set to allow a steady flow of about 0.5 cubic feet of air per minute (CFM) to flow into the test column. The air that flows out of the test column via the exhaust port is released from the test building to the atmosphere through 4-inch diameter piping that is connected to a hole in the wall of the test building.

The exhaust pipe includes a four-inch 90° PVC tee. The leg of the tee that is not in line with the exhaust pipe includes a cap that may be removed to allow a sampling of the exhaust from the test column through this leg of the tee. The top of the test column is normally covered with a PVC cap. This PVC cap may be removed so that the upper portion of the manure in the test column may be sampled or stirred, as desired.

The manure that is placed in each test column may be obtained directly from any manure source, such as a manure pit located beneath one or more feeding pens in an animal feeding barn. Alternatively, the manure destined for placement in the test columns may be obtained from a storage container that holds manure previously pumped from a manure pit of the animal feeding barn. No matter the source of the manure, manure from all sections of the manure pit or from the manure storage container are included in each test column to minimize the opportunity for variations in manure characteristics between different test columns.

For manure that is produced by pigs in a swine feeding operation, the manure is ordinarily derived from a standard corn/soybean finisher diet that includes no medical or nutritional additives. The manure is collected fresh from the manure pit or from the storage container on the day that the testing starts. The manure that is collected from the manure pit or from the storage container is agitated by circulating the collected manure with a sump pump for at least half an hour before the manure is distributed between the test columns. A set amount of the collected and agitated manure, such as about 28 gallons of the manure, is placed in each of the test columns. The day on which the manure is placed in the test columns is considered to be Day 0 of the test period.

Hydrogen Sulfide Testing

Samples of the atmosphere exhausted from the test columns are taken through the tee on the exhaust pipe by inserting the sampling portion of the test equipment into the exhaust pipe. When the hydrogen sulfide concentration in the atmosphere exhausted from the test column is thought to be less than 4 parts per million (ppm), a Jerome Model 631-X Hydrogen Sulfide analyzer is used for the hydrogen sulfide concentration determination. The Jerome Model 631-X Hydrogen Sulfide analyzer may be obtained from Arizona Instruments of Phoenix, Ariz. The analyzer probe is positioned in the exhaust pipe via the tee and the sample button on the analyzer is pressed. The analyzer then draws air from the exhaust pipe and determines the concentration of hydrogen sulfide in the sample obtained from the exhaust pipe.

When it is assumed that the concentration of hydrogen sulfide in the atmosphere of the test column is higher than 4 parts per million (ppm), a SENSIDYNE® hydrogen sulfide tube is used in combination with a sampling pump. The SENSIDYNE® hydrogen sulfide tube has a measurement range of 2.5 parts per million to 120 parts per million. The SENSIDYNE® hydrogen sulfide tube is placed in a sampling pump, such as a Gastec model GV-100S pump set. This Gastec pump set can pull two distinct air volumes, 50 ml and 100 ml. When the source is assumed to have a high concentration of hydrogen sulfide above about 80–100 parts per million, the Gastec pump set is configured set to pull a 50 ml sample through the SENSIDYNE® hydrogen sulfide tube. The reading obtained from the SENSIDYNE® hydrogen sulfide tube using this 50 ml sample volume is then multiplied by a factor of two. When the hydrogen sulfide concentration in the sample is thought to be below about 80–100 parts per million (ppm), the pump set is configured to collect a 100 ml volume, and the actual reading of the SENSIDYNE® hydrogen sulfide tube is used, rather than using a multiplication factor. Both the Gastec GV-100S pump set and the SENSIDYNE® hydrogen sulfide tube may be obtained from SKC, Inc. of Eighty-Four, Pa.

Before a sample is taken, the SENSIDYNE® hydrogen sulfide tube is positioned in the Gastec pump set in accordance with the instructions included with the Gastec pump set. Then, the handle on the Gastec pump set is aligned to pull either 50 ml or 100 ml of air through the SENSIDYNE® hydrogen sulfide tube, as appropriate. The pump probe is then positioned through the tee in the exhaust pipe of the test column. Then, the pump handle is pulled to evacuate the air sample through the SENSIDYNE® hydrogen sulfide tube. When the indicator on the Gastec pump set shows that the sample has been collected, the reading on the SENSIDYNE® hydrogen sulfide tube is read.

Ammonia Vapor Testing

The ammonia concentration in the test column may be determined using either a SENSIDYNE® ammonia tube in combination with the Gastec Model GV-100S pump set, or by using a Draeger PAC III® instrument equipped with an Draeger ammonia sensor. The details for use of the Gastec Model GV-100S pump set for determining the ammonia concentration exhausted from the test column are the same as the details provided above for determination of the hydrogen sulfide concentration in the gas exhausted from the test column, with the exception that a SENSIDYNE® ammonia tube is used instead of the SENSIDYNE® hydrogen sulfide tube. The SENSIDYNE® ammonia tube, like the SENSIDYNE® hydrogen sulfide tube, may be obtained from SKC, Inc. of Eighty-Four, Pa.

The Draeger PAC III® instrument and the ammonia sensor may each be obtained from National Draeger, Inc. of Pittsburgh, Pa. The Draeger PAC III® instrument provides a continuous digital read-out of the ammonia concentration in the air of when equipped with the ammonia sensor. To take a sample, the sample port of the Draeger PAC III® instrument is positioned through in the exhaust pipe of the tests column via the tee. The Draeger PAC III® instrument is activated to provide a continuous digital read-out of the ammonia concentration in the air that is exhausted from the test column through the exhaust pipe.

EXAMPLES

Example 1

Example 1 demonstrates the effectiveness of the suppression agent of the present invention for suppressing hydrogen sulfide emissions from manure. In Example 1, the suppression agent contained about 20 volume percent nonoxynol, about 15 volume percent of an ethanol/water blend (as the viscosity reducing agent), and about 65 volume percent acidulated soybean soapstock, based upon the total volume of the suppression agent. In the suppression agent of this example, the ethanol/water blend contained about 70 volume percent ethanol and about 30 volume percent water, based upon the total volume of the ethanol/water blend.

In this example, three test columns (columns 1, 7, & 12) were used as a control to establish the hydrogen sulfide concentration in air above manure when the suppression agent was not used, and three test columns (designated as columns 3, 11, & 15) were used to determine the hydrogen sulfide concentrations in air when the suppression agent of the present invention was applied to the manure. The six columns (columns 1, 3, 7, 11, 12, and 15) were each configured in accordance with the test column configuration details provided above under the Manure Vapor Testing Procedure section of this document. The six different test columns used in this example were structurally identical to each other and had identical dimensions.

The manure that was placed in each of the six test columns was pig manure derived from pigs that were fed a corn/soybean finisher diet that was free of medical and nutritional additives. The manure was collected in accordance with the procedure described in the Manure Vapor Testing Procedure described above in this document. The manure was collected from various sections of a storage container that was filled with manure collected from manure pits beneath a swine confinement and feeding barn. Manure from various sections of the storage tank was collected and mixed together well, prior to being loaded into the six different test columns. Identical manure was placed in each of the six different test columns. Additionally, the same volume of manure was placed into each of the six different test columns.

The manure was placed into each of the test columns on Day 0. No new manure application occurred after Day 0. The manure was not stirred or mixed in any of the six test columns anytime during the test period. The handling of the manure in test columns 1, 3, 7, 11, 12 and 15 was identical, with the exception that the suppression agent was sprayed onto the exposed surface of the manure in test columns 3, 11, and 15 on Day 0 of the test period. The suppression agent that was applied to the manure in test columns 3, 11 and 15 had the formulation specified previously in this example. For a particular one of the test columns 3, 11 or 15, the manure volume in the particular test column was multiplied by 0.0005 to determine the volume of suppression agent to be applied to the particular test column on Day 0 of the test period.

The hydrogen sulfide determinations were made in accordance with the hydrogen sulfide determination procedure set forth in the Manure Vapor Testing Procedure that is described previously in this document. Table 4 below summarizes the hydrogen sulfide determinations for the manure in the three test columns (1, 7, and 12) in which the suppression agent was not used, and Table 5 provides the hydrogen sulfide results on each of the test days for the three test columns (3, 11, & 15) in which the manure was treated with this suppression agent. Tables 4 and 5 also provide averages over the test period for each individual test column and thereafter provide an average of the three individual test column averages.

TABLE 4

INDIVIDUAL TEST COLUMNS
CONTROL (Hydrogen Sulfide Suppression Agent Not Used)

| TEST SOURCE | DAY 7 | DAY 10 | DAY 14 | DAY 21 | AVERAGE OF DAYS 7, 10, 14, & 21 |
|---|---|---|---|---|---|
| COLUMN 1 | 996.67 | 656.67 | 1533.33 | 1833.33 | 1673.33 |
| COLUMN 7 | 780.00 | 1133.33 | 1400.00 | 1040.00 | 1451.11 |
| COLUMN 12 | 740.00 | 1046.67 | 1633.33 | 9333.33 | 4251.11 |
| | | | | | AVERAGE = 2458.52 |

TABLE 5

INDIVIDUAL TEST COLUMNS
HYDROGEN SULFIDE SUPPRESSION AGENT USED

| TEST SOURCE | DAY 7 | DAY 10 | DAY 14 | DAY 21 | AVERAGE OF DAYS 7, 10, 14, & 21 |
|---|---|---|---|---|---|
| COLUMN 3 | 620.00 | 193.33 | 260.00 | 340.00 | 471.11 |
| COLUMN 11 | 803.33 | 270.00 | 186.67 | 150.00 | 470.00 |
| COLUMN 15 | 843.33 | 310.00 | 410.00 | 450.00 | 671.11 |
| | | | | | AVERAGE = 537.41 |

These results of Tables 4 and 5 demonstrate that hydrogen sulfide emissions of manure that was treated with the suppression agent in accordance with the present invention, as reflected by the concentration of hydrogen sulfide vapor in the air passing over the manure, was about 78 percent lower than the amount of hydrogen sulfide emissions from manure not treated with any suppression agent:

$$\frac{537.41 - 2458.52}{2458.52} \times 100\% = -78.1\%$$

The data in Tables 4 and 5 is further manipulated and re-presented in Tables 6 and 7, respectively, to show additional data in which hydrogen sulfide determinations were made.

TABLE 6

LOW, HIGH, & AVERAGE OF TEST COLUMNS
CONTROL (Hydrogen Sulfide Suppression Agent Not Used)

| TEST VALUE | DAY 7 | DAY 10 | DAY 14 | DAY 21 | AVERAGE OF DAYS 7, 10, 14, & 21 |
|---|---|---|---|---|---|
| LOW OF COLUMNS 1, 7, & 12 | 740.00 | 656.67 | 1400.00 | 1040.00 | 959.17 |

TABLE 6-continued

LOW, HIGH, & AVERAGE OF TEST COLUMNS
CONTROL (Hydrogen Sulfide Suppression Agent Not Used)

| TEST VALUE | DAY 7 | DAY 10 | DAY 14 | DAY 21 | AVERAGE OF DAYS 7, 10, 14, & 21 |
|---|---|---|---|---|---|
| HIGH OF COLUMNS 1, 7, & 12 | 996.67 | 1133.33 | 1633.33 | 1833.33 | 1399.17 |
| AVERAGE OF COLUMNS 1, 7, & 12 | 838.89 | 945.56 | 1522.22 | 2873.33 | 1545.00 |

TABLE 7

LOW, HIGH, & AVERAGE OF TEST COLUMNS
HYDROGEN SULFIDE SUPPRESSION AGENT USED

| TEST VALUE | DAY 7 | DAY 10 | DAY 14 | DAY 21 | AVERAGE OF DAYS 7, 10, 14, & 21 |
|---|---|---|---|---|---|
| LOW OF COLUMNS 3, 11, & 15 | 620.00 | 193.33 | 186.67 | 150.00 | 287.5 |
| HIGH OF COLUMNS 3, 11, & 15 | 843.33 | 310.00 | 410.00 | 450.00 | 503.33 |
| AVERAGE OF COLUMNS 3, 11, & 15 | 755.55 | 257.78 | 285.56 | 313.33 | 403.06 |

The daily average of the lowest and highest reading obtained from the three test columns in which the suppression agent was not used (Table 6), and for the three test columns in which the suppression agent was used (Table 7) are provided. These averages for the individual days are thereafter averaged in both Tables 6 and 7. These averages of the daily averages also demonstrate an elevated reduction (about 74 percent) in the hydrogen sulfide concentration in air from manure treated with the suppression agent, as compared to the air above manure that was not treated with this suppression agent.

$$\frac{403.06 - 1545.00}{1545} \times 100\% = -73.9\%$$

Thus, comparison of the data in Table 5 versus the data in Table 4 and comparison of the data in Table 7 versus the date in Table 6 each establish that treatment of the manure with the suppression agent in accordance with the present invention causes an ambient reduction of hydrogen sulfide emissions in air located over manure that is greater than about 70 percent. Such a large reduction in hydrogen sulfide concentration in the air located over manure will benefit both animal and human beings that are exposed to the manure.

Example 2

This example demonstrates various benefits realized when the suppression agent of the present invention is applied to manure in a swine confinement and feeding operation. These improvements include a reduction in the amount of feed required to attain a particular weight gain, a reduction in the death rate of the animals, a reduction in the feed cost per hundred pounds of weight gain, and a reduction in the vet cost per one hundred pounds of animal at the time of animal sale. In this example, all testing was conducted in a particular barn that is designated as Barn No. 1. Other than some minor changes in the particular pigs present in the barn, and the presence or lack of suppression agent utilization, all variables, such as feed composition, feed availability, and barn conditions were the same throughout each of the test periods. Each of the test periods (test periods 1, 2, 3 and 4) were four months long. In test periods 1 and 2, no application of suppression agent occurred, and in test periods 3 and 4, suppression agent application did occur. The suppression agent had the formulation set forth in Example 1 above.

Barn No. 1 was similar in configuration to the barn design 10 of the FIGURE. Manure pits were located beneath each of the individual animal pens. The volumetric application of the suppression agent was the same as described previously in the document and was determined by multiplying the overall manure pit capacity in Barn No. 1 by 0.0005. The overall volume of the suppression agent was divided by four to calculate the monthly application rate. The monthly application rate was divided by the number of pens located over manure pits in Barn No. 1 to determine the individual pen monthly application rate. During test periods 3 and 4, the suppression agent was applied to the exposed surface of the manure in the Barn No. 1 manure pits at the individual pen monthly application rate, proximate the center of each individual pen, at the beginning of the first month and at the end of the first, second, and third months of the test period. The manure was not stirred during any of the test periods, though new manure from pigs kept in Barn No. 1 did fall into the manure pits during the various test periods. Again, no suppression agent application occurred during test periods 1 and 2. Also, test periods 1 and 2 were completed prior to the start of test periods 3 and 4.

Details about the ratio of feed to weight gain, the death loss percentage, cost of feed per one hundred pounds of weight gain, and the cost of veterinary care per one hundred pounds of pig are provided in Table 8 for both test periods 1 and 2 that occur prior to application of any suppression agent and fore test periods 3 and 4 that incorporated suppression agent application. Additionally, a long term control average figure is provided for each of these four variables. The long term control average was determined over a period longer than four months. Additionally, no suppression agent application occurred during the long term control period. Also, other than some changes in which pigs were present, all variables during the long term control period were similar or identical to those present during test periods 1 and 2.

TABLE 8

BARN NO. 1

|  |  | FEED EFFICIENCY | DEATH LOSS | FEED COST PER CWT GAIN | VET COST PER CWT SOLD |
|---|---|---|---|---|---|
| TESTING BEFORE APPLICATION OF SUPPRESSION AGENT | TEST PERIOD 1 | 2.89 | 2.8% | $ 22.82 | $ 0.53 |
|  | TEST PERIOD 2 | 2.84 | 3.1% | $ 18.89 | $ 0.40 |
|  | AVERAGE OF TEST PERIODS 1 & 2 | 2.87 | 3.0% | $ 20.86 | $ 0.47 |
| TESTING AFTER APPLICATION OF SUPPRESSION AGENT | TEST PERIOD 3 | 2.65 | 2.6% | $ 15.49 | $ 0.29 |
|  | TEST PERIOD 4 | 2.75 | 0.8% | $ 15.55 | $ 0.19 |
|  | AVERAGE OF TEST PERIODS 3 & 4 | 2.7 | 1.7% | $ 15.52 | $ 0.24 |
| LONG TERM CONTROL AVERAGE |  | 2.79 | N.D. | $ 16.01 | $ 0.32 |
| COMPARISON OF AVERAGES BEFORE & AFTER APPLICATION OF SUPPRESSION AGENT | AVERAGE OF TEST PERIODS 1 & 2 | 2.87 | 3.0% | $ 20.86 | $ 0.47 |
|  | AVERAGE OF TEST PERIODS 3 & 4 | 2.7 | 1.7% | $ 15.52 | $ 0.24 |
|  | DIFFERENCE BETWEEN AVERAGES | −.17 (+5.92%) | −1.25% (−41.67%) | −$ 5.34 (−25.6%) | −$ 0.23 (−48.9%) |
| COMPARISON OF CONTROL AVERAGE & AVERAGE AFTER APPLICATION OF SUPPRESSION AGENT | CONTROL AVERAGE | 2.79 | N.D. | $ 16.01 | $ 0.32 |
|  | AVERAGE OF TEST PERIODS 3 & 4 | 2.7 | N.D. | $ 15.52 | $ 0.24 |
|  | DIFFERENCE BETWEEN AVERAGES | −0.09 (+3.22%) | N.D. | −$ 0.48 (−3.0%) | −$ 0.08 (−25%) |

"N.D." Means "Not Determined"

Comparison of the results obtained during test periods 1 and 2, versus test periods 3 and 4 demonstrates that the amount of feed required for a particular weight gain decreased such that the net feed efficiency improved by nearly six percent when the suppression agent was used. Surprisingly, the death rate among pigs decreased from about three percent, before application of the suppression agent, to only about 1.7 percent as a result of suppression agent use. Thus, suppression agent use caused a drop in the death rate among the pigs of nearly 42 percent. Likewise, the cost of feed for one hundred pounds of weight gain in the test pigs decreased by about $5.34, or by about 25.6 percent, when the suppression agent was used. Correspondingly, veterinary costs dropped nearly in half as a result of suppression agent usage. As reflected in Table 8, improvements in the feed efficiency, reductions in the cost of feed per one hundred pounds of weight gain, and reductions in the veterinary cost per one hundred pounds of animals sold were also realized when comparing the test period when the suppression agent was used to the long term control average when the suppression agent was not used.

Thus, the significant noxious vapor emission reductions from the manure, as reflected by the reduction in hydrogen sulfide emission (see Example 1 above), due to the inventive use of the suppression agent, improved feed efficiency, reduced the cost of feed per one hundred pounds of weight gain, reduced the veterinary cost per one hundred pounds of animals sold, and decreased the death rate of the test pigs. Consequently, the inventive use of the suppression agent improved animal health and improved the economics of the animal confinement and feeding operation.

Example 3

This example demonstrates various benefits realized when the suppression agent is applied in accordance with the present invention to manure that is located in a swine confinement and feeding operation. These benefits include a reduction in the amount of feed required to attain a particular weight gain and a reduction in the feed cost per hundred pounds of weight gain. In this example, all testing was conducted in a particular barn that is designated as Barn No. 2. Barn No. 2 was similar in configuration and size to Barn No. 1.

Other than for some minor changes in the particular pigs present in the barn, and the presence or lack of suppression agent use, all variables, such as feed composition, feed availability, and Barn No. 2 conditions, were the same throughout all test periods. Each of the test periods (test periods 1, 2, 3, 4, 5, & 6) were four months long. In test periods 1 and 2, no application of suppression agent occurred, and in test periods 3, 4, 5, and 6 suppression agent application did occur. The suppression agent had the formulation set forth in Example 1 above and consequently had the same formulation as the suppression agent that was used in Example 2.

Barn No. 2 was similar in configuration to the barn design 10 of the FIGURE. Manure pits were located beneath each of the individual animal pens. The volumetric application of the suppression agent was the same as described previously in the document and was determined by multiplying the overall manure pit capacity in Barn No. 2 by 0.0005. The overall volume of the suppression agent was divided by four to calculate the monthly application rate. The monthly application rate was divided by the number of pens located over manure pits in Barn No. 1 to determine the individual pen monthly application rate. During test periods 3, 4, 5, & 6, the suppression agent was applied to the exposed surface of the manure in the Barn No. 2 manure pits at the individual pen monthly application rate, proximate the center of each individual pen at the beginning of the first month and at the end of the first, second, and third months. The manure was not stirred during any of the test periods, though new manure from pigs kept in Barn No. 2 did fall into the manure pits during the various test periods. Again, no suppression agent application occurred during test periods 1 and 2. Also, test periods 1 and 2 were completed prior to the start of test periods 3, 4, 5, & 6.

Details about the ratio of feed consumption to weight gain and the feed cost per one hundred pounds of weight gain are provided in Table 9 for both test periods 1 and 2 that occurred prior to application of any suppression agent and for test periods 3, 4, 5, and 6 that incorporated the suppression agent. In this example, test periods 1 and 2 are considered to be the control.

TABLE 9

BARN NO. 2

| | | FEED EFFICIENCY | FEED COST PER CWT GAIN |
|---|---|---|---|
| CONTROL (TESTING BEFORE APPLICATION OF SUPPRESSION AGENT) | TEST PERIOD 1 | 2.99 | $ 17.57 |
| | TEST PERIOD 2 | 3.07 | $ 17.60 |
| | CONTROL AVERAGE (AVERAGE OF TEST PERIODS 1 & 2) | 3.03 | $ 17.58 |
| TESTING AFTER APPLICATION OF SUPPRESSION AGENT | TEST PERIOD 3 | 2.81 | $ 16.06 |
| | TEST PERIOD 4 | 2.96 | $ 16.91 |
| | TEST PERIOD 5 | 2.79 | $ 15.86 |
| | TEST PERIOD 6 | 2.89 | N.C. |
| | AVERAGE OF TEST PERIODS 3, 4, 5, & 6 | 2.86 | $ 16.28 |
| COMPARISON OF AVERAGES BEFORE & AFTER APPLICATION OF SUPPRESSION AGENT | CONTROL AVERAGE | 3.03 | $ 17.58 |
| | AVERAGE OF TEST PERIODS 3, 4, 5, & 6 | 2.86 | $ 16.28 |
| | DIFFERENCE BETWEEN AVERAGES | −0.17 (+5.6%) | −$ 1.31 (−7.45%) |

"N.C." Means "Not Conducted"

Comparison of the results obtained during test periods 1 and 2, versus the results obtained during test periods 3, 4, 5, and 6, demonstrates that the amount of feed required for a particular weight gain decreased such that the net feed efficiency improved by a little less than six percent when the suppression agent was used. Surprisingly, application of the suppression agent caused the cost of feed per one hundred pounds of weight gain in the test pigs to decrease by about $1.31, or by about 7.5% percent, when the suppression agent was used. Thus, the significant noxious vapor emission reductions from the manure, as reflected by the reduction in hydrogen sulfide emission (see Example 1 above), due to the inventive use of the suppression agent, improved feed efficiency and decreased the relative feed cost for animals exposed to manure treated in accordance with the present invention. Consequently, the inventive use of the suppression agent improved both animal health and improved the economics of the animal confinement and feeding operation.

Although the present invention has been described with reference to preferred embodiments, workers skilled in the art will recognize that changes may be made in form and detail without departing from the spirit and scope of the invention.

What is claimed is:

1. A method of increasing the feed efficiency of an animal, the method comprising:
    applying a suppression agent to surfaces of manure that are exposed to atmosphere, the suppression agent comprising acidulated plant-based soapstock, the manure located proximate the animal; and
    providing feed to the animal.

2. The method of claim 1 wherein the concentration of the acidulated plant-based soapstock in the suppression agent ranges from about 20 volume percent to about 70 volume percent, based upon the total volume of the suppression agent.

3. The method of claim 1 wherein the suppression agent further comprises an emulsifying agent.

4. The method of claim 3 wherein the emulsifying agent comprises an ethoxylated nonylphenol.

5. The method of claim 3 wherein the emulsifying agent comprises nonoxynol.

6. The method of claim 3 wherein the concentration of the emulsifying agent in the suppression agent ranges from about 20 volume percent to about 60 volume percent, based upon the total volume of the suppression agent.

7. The method of claim 1 wherein the suppression agent further comprises a viscosity modification agent.

8. The method of claim 7 wherein the viscosity modification agent comprises an alcohol.

9. The method of claim 7 wherein the viscosity modification agent is ethanol, isopropanol, n-butanol, any of these in any combination, or an ethanol/water blend.

10. The method of claim 9 wherein the concentration of ethanol in the ethanol/water blend is about 70 volume percent, based on the total volume of the ethanol/water blend.

11. The method of claim 7 wherein the concentration of the viscosity reducing agent in the suppression agent ranges from about 10 volume percent to about 20 volume percent, based upon the total volume of the suppression agent.

12. The method of claim 1 wherein the suppression agent is effective to reduce noxious gas emissions from the manure.

13. The method of claim 12 wherein the noxious gas is ammonia, hydrogen sulfide, or any combination of any of these.

14. The method of claim 1 wherein the plant-based acidulated soapstock is acidulated soybean soapstock, acidulated corn soapstock, acidulated cottonseed soapstock, acidulated canola seed soapstock, acidulated sunflower seed soapstock, acidulated safflower seed soapstock, acidulated olive soapstock, acidulated palm kernel soapstock, acidulated coconut soapstock, acidulated peanut soapstock, acidulated walnut soapstock, or any of these in any combination.

15. The method of claim 1 wherein applying the suppression agent to the manure comprises pouring or spraying the suppression agent onto exposed surfaces of the manure.

16. A method of reducing the feed requirement of animals exposed to manure while retaining the rate at which the animals gain weight, the method comprising:
    forming a treating agent, the treating agent comprising acidulated plant-based soapstock; and applying the treating agent to exposed surfaces of the manure, the manure located proximate the animals during feed consumption by the animals.

17. A method of reducing the rate of death of animals exposed to manure, the method comprising:
    forming a treating agent, the treating agent comprising acidulated plant-based soapstock; and
    applying the treating agent to exposed surfaces of the manure, the manure located proximate the animals.

18. The method of claim 17 wherein application of the treating agent to the manure is effective to reduce the feed requirement of the animals exposed to the manure while retaining the rate at which the animals gain weight.

19. The method of claim 17 wherein application of the treating agent to the manure is effective to reduce noxious gas emissions from the manure.

20. A composition, the composition comprising:
    manure having an outer surface; and
    a treating agent, the treating agent in contact with the outer surface of the manure, the treating agent comprising acidulated plant-based soapstock, and the treating agent effective to reduce the feed requirement of animals exposed to the manure while retaining the rate at which the animals gain weight.

21. The composition of claim 20 wherein the concentration of the acidulated plant-based soapstock in the treating agent ranges from about 20 volume percent to about 70 volume percent, based upon the total volume of the treating agent.

22. The composition of claim 20 wherein the treating agent further comprises an emulsifying agent.

23. The composition of claim 22 wherein the emulsifying agent comprises an ethoxylated nonylphenol.

24. The composition of claim 22 wherein the emulsifying agent comprises nonoxynol.

25. The composition of claim 22 wherein the concentration of the emulsifying agent in the treating agent ranges from about 20 volume percent to about 60 volume percent, based upon the total volume of the treating agent.

26. The composition of claim 20 wherein the treating agent further comprises a viscosity modification agent.

27. The composition of claim 26 wherein the viscosity modification agent comprises an alcohol.

28. The composition of claim 26 wherein the viscosity modification agent is ethanol, isopropanol, n-butanol, any of these in any combination, or an ethanol/water blend.

29. The composition of claim 28 wherein the concentration of ethanol in the ethanol/water blend is about 70 volume percent, based on the total volume of the ethanol/water blend.

30. The composition of claim 26 wherein the concentration of the viscosity reducing agent in the treating agent ranges from about 10 volume percent to about 20 volume percent, based upon the total volume of the treating agent.

31. The composition of claim 20 wherein the manure has an interior portion that is free of contact with the outer surface of the manure, the interior portion of the manure free of the treating agent.

32. The composition of claim 20 wherein the treating agent is effective to reduce noxious gas emissions from the manure.

33. The composition of claim 32 wherein the noxious gas is ammonia, hydrogen sulfide, or any combination of any of these.

34. The composition of claim 20 wherein the plant-based acidulated soapstock is acidulated soybean soapstock, acidulated corn soapstock, acidulated cottonseed soapstock, acidulated canola seed soapstock, acidulated sunflower seed soapstock, acidulated safflower seed soapstock, acidulated olive soapstock, acidulated palm kernel soapstock, acidulated coconut soapstock, acidulated peanut soapstock, acidulated walnut soapstock, or any of these in any combination.

35. A composition, the composition comprising:
    manure having an outer surface; and
    a coating material, the coating material in contact with the outer surface of the manure, the coating material comprising acidulated plant-based soapstock, and the coating material effective to reduce the rate of death of animals exposed to the manure.

* * * * *